United States Patent
Harland et al.

(10) Patent No.: US 11,036,663 B2
(45) Date of Patent: Jun. 15, 2021

(54) EXPANSION CARD CONFIGURATION OF MOTHERBOARD

(71) Applicant: Amazon Technologies, Inc., Seattle, WA (US)

(72) Inventors: Jason Alexander Harland, Seattle, WA (US); Max Jesse Wishman, Seattle, WA (US); Darin Lee Frink, Lake Tapps, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/414,394

(22) Filed: May 16, 2019

(65) Prior Publication Data

US 2019/0272246 A1 Sep. 5, 2019

Related U.S. Application Data

(62) Division of application No. 14/852,126, filed on Sep. 11, 2015, now Pat. No. 10,296,478.

(51) Int. Cl.
*G06F 13/40* (2006.01)
*G06F 12/00* (2006.01)
*G06F 1/18* (2006.01)
*G06F 13/12* (2006.01)

(52) U.S. Cl.
CPC .......... *G06F 13/4022* (2013.01); *G06F 1/185* (2013.01); *G06F 13/12* (2013.01); *G06F 13/4068* (2013.01)

(58) Field of Classification Search
CPC ............................ G06F 13/4022; G06F 12/00
See application file for complete search history.

(56) References Cited

U.S. PATENT DOCUMENTS

| | | |
|---|---|---|
| 2006/0098020 A1 | 5/2006 | Shen et al. |
| 2007/0139423 A1 | 6/2007 | Kong et al. |
| 2007/0294458 A1 | 12/2007 | Danilak |
| 2015/0347345 A1* | 12/2015 | Hellriegel ............. G06F 13/409 710/301 |
| 2015/0381288 A1 | 12/2015 | Gao |

* cited by examiner

*Primary Examiner* — David E Martinez
(74) *Attorney, Agent, or Firm* — Klarquist Sparkman, LLP

(57) ABSTRACT

A system and method are described for configuring a motherboard using expansion cards plugged into motherboard slots. In particular, each of the expansion cards can include a control signal that is supplied to the motherboard and that can configure hardware positioned on the motherboard. In one embodiment, the configuration allows a communication path to be switched on to allow the expansion cards to cross communicate.

6 Claims, 8 Drawing Sheets

EXPANSION CARD CONFIGURATION OF MOTHERBOARD

CROSS-REFERENCE TO RELATED APPLICATION

This is a divisional of U.S. patent application Ser. No. 14/852,126, filed Sep. 11, 2015, which application is incorporated herein by reference in its entirety.

BACKGROUND

Computer architecture includes well-known components, such as a motherboard. Generally, the motherboard is a main printed circuit board (PCB) that holds system components, such as a processor, memory, etc. The motherboard also includes card slots for system expansion. The card slots can receive expansion cards that plug into the slots and communicate with the motherboard. Many motherboards include a bus for communicating between system components. Typical buses in computer architecture are distributed to multiple system components. More recent computer architectures have dedicated "lanes", which is a point-to-point communication, such as a PCIe lane, wherein an expansion card can communicate with a dedicated processor, for example.

Especially in systems with point-to-point communication schemes, communication between expansion cards within the slots is more limited, and typically cabling needs to be added to efficiently allow cards to cross-communicate. Cabling between cards increases costs and can cause connectivity problems due to human connection errors.

DETAILED DESCRIPTION

The embodiments described herein provide a motherboard with a configurable switching architecture that allows for cross-connectivity between expansion cards on separate expansion slots. In particular embodiments, the expansion cards can configure switches on the motherboard so as to place the motherboard in one of at least two configuration modes. In a first mode, the expansion cards are of a type that does not permit cross-communication and the expansion cards can configure one or more switches on the motherboard so as to allow standard connectivity such that the expansion cards cannot communicate directly with each other. In the second mode of operation, switches on the motherboard can detect that the expansion cards are of a type that permit cross-communication and a cross-communication channel is established between the expansion cards. Accordingly, each of the expansion cards can configure one or more switches on the motherboard such that a communication channel is connected between the expansion cards. By allowing the expansion cards to directly connect through a communication channel, cabling can be avoided as the communication channel is a dedicated channel traced into the motherboard. Additionally, allowing expansion cards to configure a motherboard through a configuration of switches allows the motherboard to be multifunctional (i.e., have multiple modes of operation for different types of expansion cards).

Figure 1:
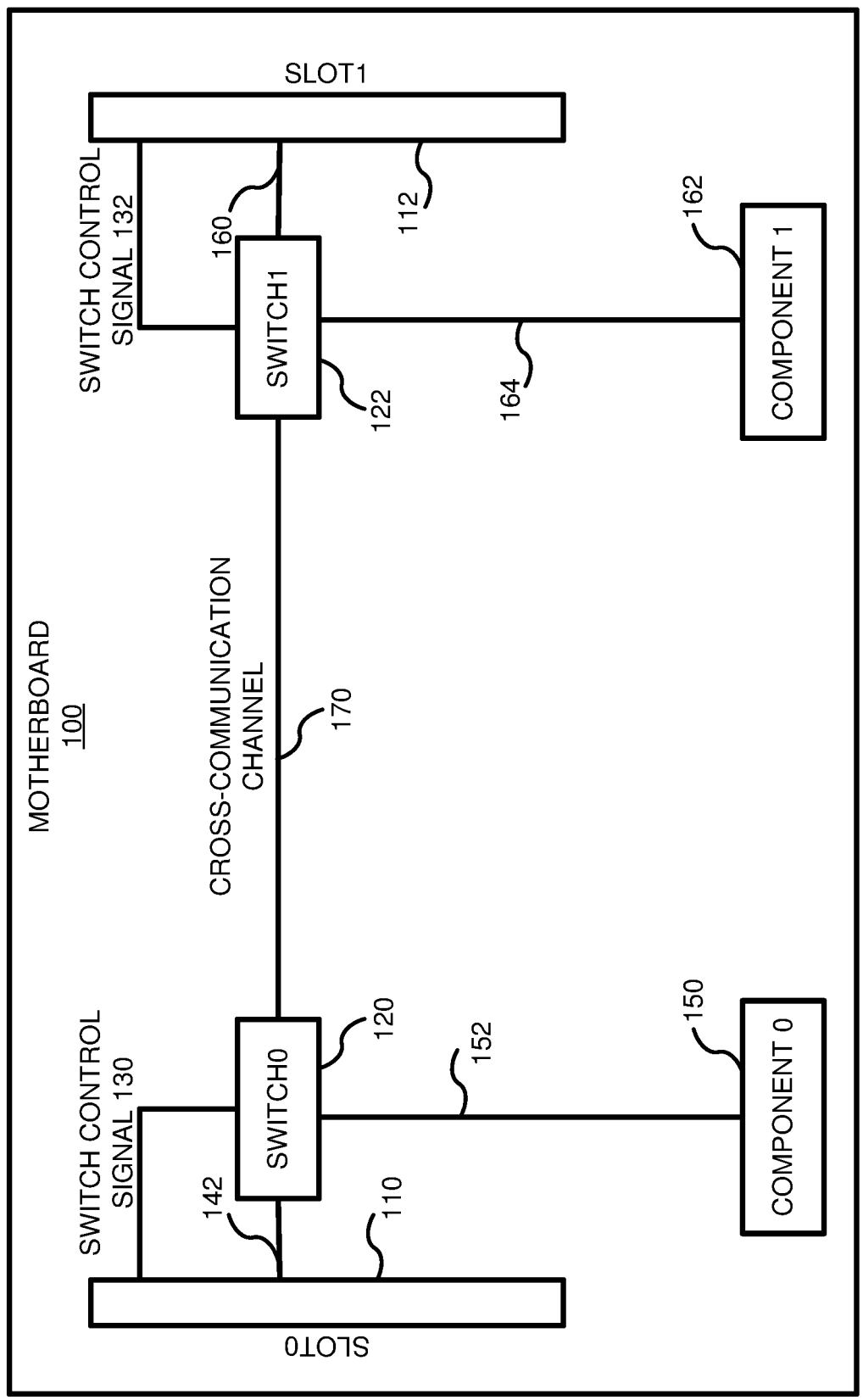
FIG. 1 shows an example motherboard according to a first embodiment that includes dedicated switches for selectively cross-coupling expansion slots through traces on the motherboard.

FIG. 1 is an example motherboard 100 according to a first embodiment. The motherboard can be mounted in a computer chassis (not shown), such as is typically used for a server computer or other computing device. The motherboard includes multiple expansion slots 110, 112 which are adapted to receive expansion cards (not shown) so that an electrical coupling can occur between the expansion cards and the motherboard 100. Depending on the type of expansion card plugged into the slots 110, 112, switches 120, 122 configure the motherboard differently. In particular, in this embodiment, one or more pins on the slots are coupled to provide control signals to the switches 120, 122 so as to configure the switches. In particular, slot 0, shown at 110, has a control signal line 130 coupled to the switch 120, so as to configure the switch. Likewise slot 1, shown at 112, has a control signal line 132 that extends from a pin on slot 1 to the switch 122.

In a first mode of operation where the expansion cards do not permit a cross-communication channel, the switch 120 couples a communication channel 142 to a component 150 via a communication channel 152. The communication channel 142 can be one or more signal traces coupled in parallel and connected to different pins on the expansion slot 110. Likewise, the communication channel 152 is one or more signal traces in parallel on the motherboard for coupling the switch 120 and the component 150. A similar architecture can be designed for slot 112 which has a communication channel 160 extending between one or more pins on the slot 112 and the switch 122. When the switch 122 is so configured as to couple the slot 112 and a component 162, the switch 122 couples the communication channel 160 to a communication channel 164 which extends between the switch 122 and the component 162.

In a second mode of operation, expansion cards within the slots 110, 112 can configure the switches 120, 122 so as to directly couple communication channel 142 and communication channel 160 via a cross-communication channel 170. In this mode of operation, the slots 110 and 112 are no longer coupled to the components 150, 162 via the communication channels 152, 164. Instead, expansion cards that are plugged into the slots 110, 112 can directly communicate with each other through the cross communication channel 170. It should be noted that there can be other communication channels between the components 150 and 162 that pass directly to the slots without going through the switches, as further described below.

Thus, the motherboard 100 allows expansion cards plugged into the motherboard to set a configuration of switches on the motherboard so as to configure communication channels on the motherboard. In the examples shown, the control signals 130, 132 can be a predetermined voltage level supplied by the expansion cards to the switches. In other embodiments, the control signals 130, 132 can be removed and the switches can include more intelligence so as to interrogate the expansion cards and determine in which mode the switches should be configured. For example, the switch can include a processor together with a switch component wherein the processor can communicate with the expansion card to determine a type of expansion card and then configure the switch accordingly. In some embodiments, the components 150, 162 can be receptacles (e.g., IC sockets) into which hardware components can be inserted. Thus, the motherboard can be sold without the actual hardware components, which can then later be added by a customer.

Figure 2:
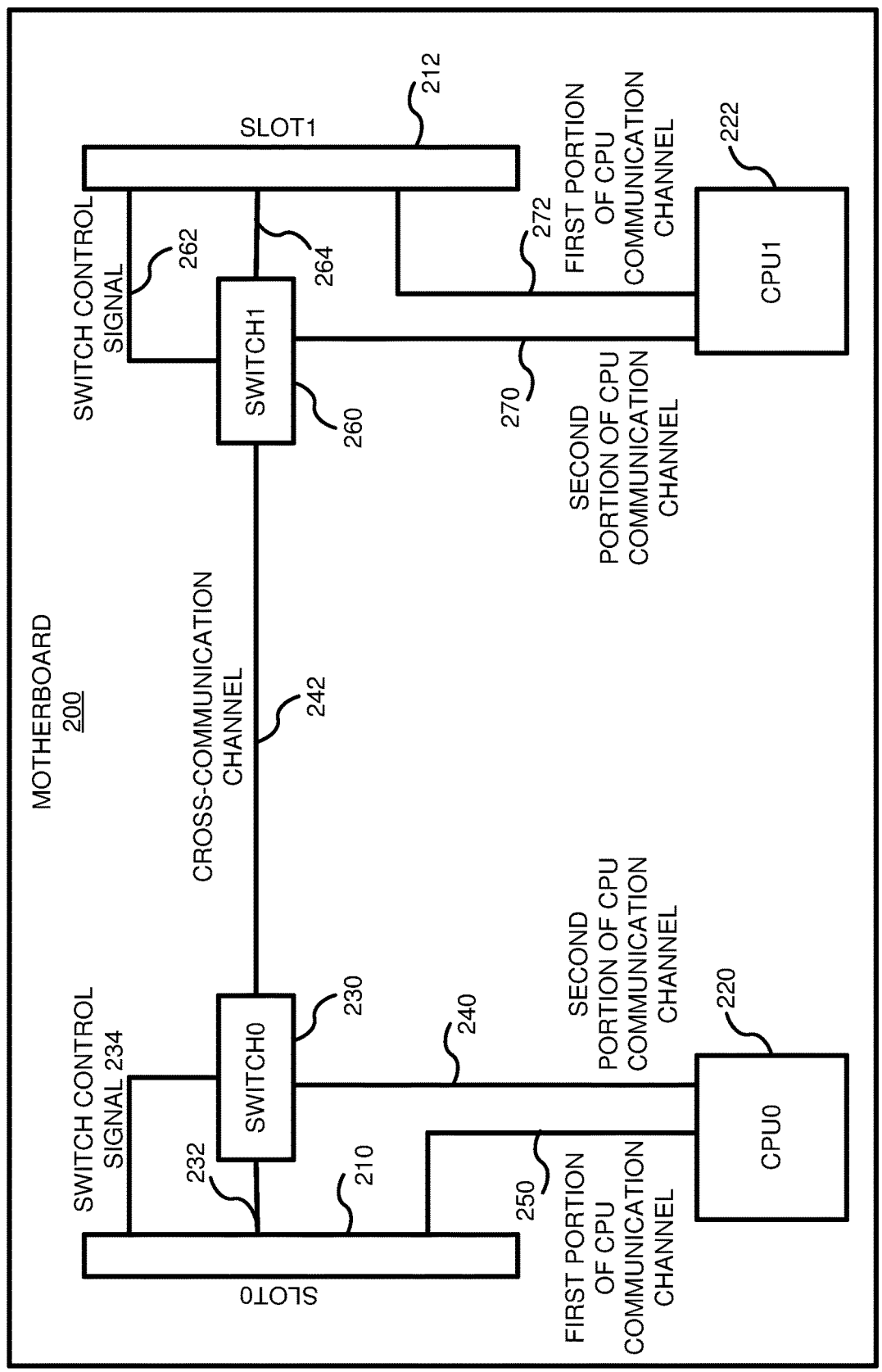
FIG. 2 is another embodiment of a motherboard including multiple expansion slots each of which is coupled to a dedicated CPU.

FIG. 2 shows a particular embodiment of a motherboard 200 wherein expansion slots 210, 212 are coupled to dedicated components 220, 222, shown in this case as central processing units (CPU). Like in FIG. 1, the CPUs can be merely receptacles for receiving the CPUs, as the actual CPUs need not be included on the motherboard. In one particular industry example, the expansion slots 210, 212 can be configured for a PCIe standard wherein the slots are coupled to dedicated CPUs. In this example, a switch 230 is coupled to slot 210 via a communication channel 232. A control signal line 234 is coupled between one or more pins on the slot and the switch 230 to control the configuration of the switch. In accordance with a control signal on the control signal line 234, the switch 230 can couple the communication channel 232 with a communication channel 240 or with a communication channel 242. The communication channel 240 extends from the switch to the CPU 220 and, in a first mode of operation, the switch control signal can couple the slot 210 to the CPU 220. In a second mode of operation, the switch control signal can configure the switch 230 such that the channel 232 is coupled to the cross-communication channel 242. In this case, the communication channel 232 is decoupled from the communication channel 240. As shown, the communication channel 240 is a portion of a larger communication channel between the slot 210 and the CPU 220 made up of a first portion 250 and the second portion 240. Consequently, the CPU 220 can have a dedicated portion 250 that is always coupled to the slot 210 and is not selectively configurable whereas the second portion of the CPU communication channel 240 is selectively configurable through the switch control signal 234. The slot 212 can mirror the architecture of slot 210 by having a switch 260 that is configurable by a control signal on control signal line 262 so as to either couple a communication channel 264 to the cross-communication channel 242 or couple the communication channel 264 to a communication channel 270 extending from the switch 260 to the CPU 222. The CPU 222 can also have a dedicated channel 272 that does not pass through the switch and that is always coupled directly to the slot 212. The communication channels 270 and 272 can form a combined communication channel to the slot 212. For example, in a particular mode of operation wherein the cross-communication channel 242 is not permitted, the combined communication channel 270, 272 can form CPU lanes 0-15 on a PCIe connector.

Figure 3:
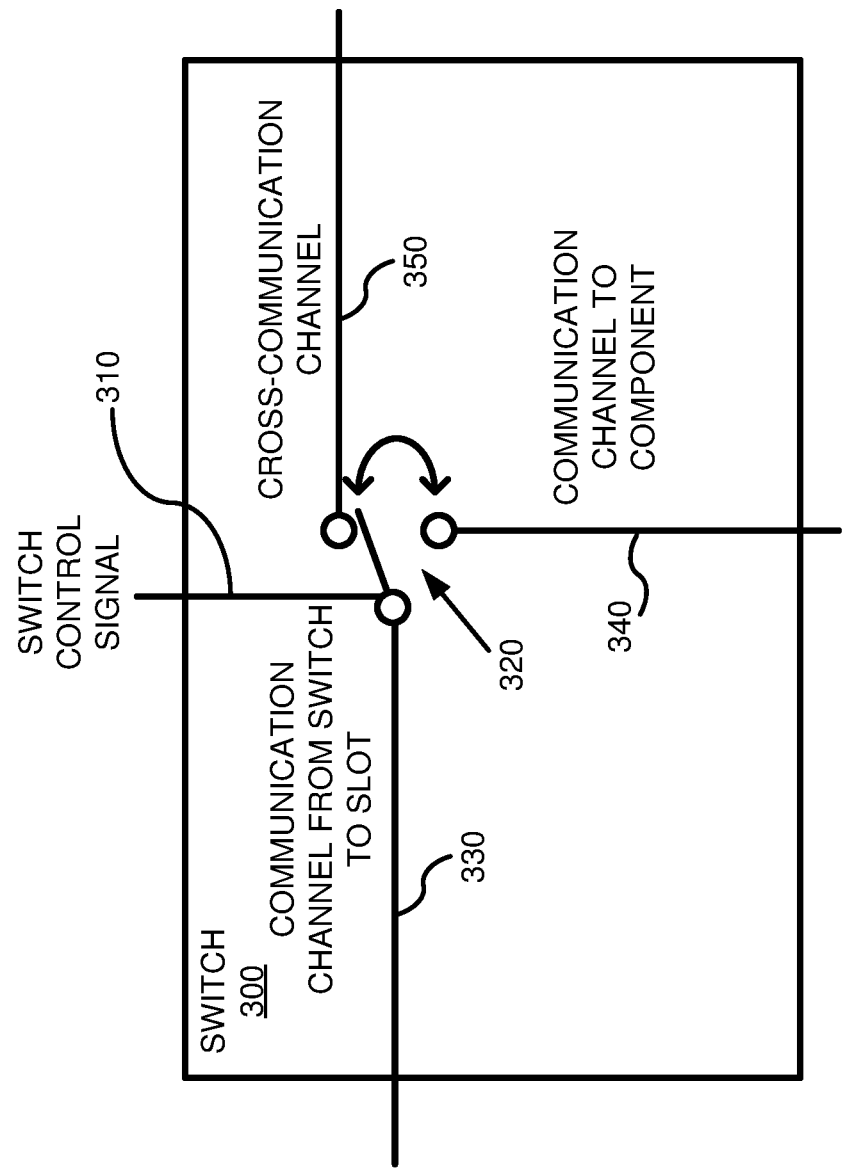
FIG. 3 is an embodiment of a switch that can be used as one of the switches in the embodiments of FIGS. 1 and 2.

FIG. 3 shows an example switch 300 that can be used as the switches from FIG. 1 or 2. A variety of switches can be used, but in this example the switch is shown as a single pole, double-throw switch. It will be understood that the switch switches multiple parallel traces that form a communication channel, although a single line is shown for simplicity. In this case, the switch control signal 310 is applied to a switching element 320 to control whether the switch is in a first mode of operation, where a communication channel 330 is coupled to a communication channel 340 or a second mode where the communication channel 330 is coupled to a communication channel 350. The communication channel 340 is the communication channel to the component 150 of FIG. 1 or to the CPU 220 of FIG. 2. The cross-communication channel 350 is the channel 170 or 242 that extends between the switches in either of FIGS. 1 and 2. In a particular embodiment, a present pin can be coupled to the control signal line. In the PCIe standard, the present pin is typically grounded to indicate an expansion card is present in a slot. Such a grounded control signal on line 310 can couple the communication channel 330 to the communication channel 340 so that the motherboard is in a standard configuration in accordance with the PCIe standard. In an alternative configuration, the control signal can be such that the expansion card uses a predetermined voltage threshold on the present pin, which is contrary to the existing PCIe standard. In this case, the threshold voltage level can be enough to switch the switch 320 so as to reconfigure the motherboard to allow cross-communication from the slot on the cross-communication channel 350. As was described in FIGS. 1 and 2, such a cross-communication channel can be used as a dedicated channel to allow two expansion cards to communicate together. Additional expansion cards and switches can be added to allow three or more expansion cards to communicate. For example, referring to FIG. 2, additional switches can be added and the cross-communication channel 242 can be coupled directly to those switches so as to allow communication between additional expansion slots and the expansion slots that are shown at 210 and 212.

Figure 4:
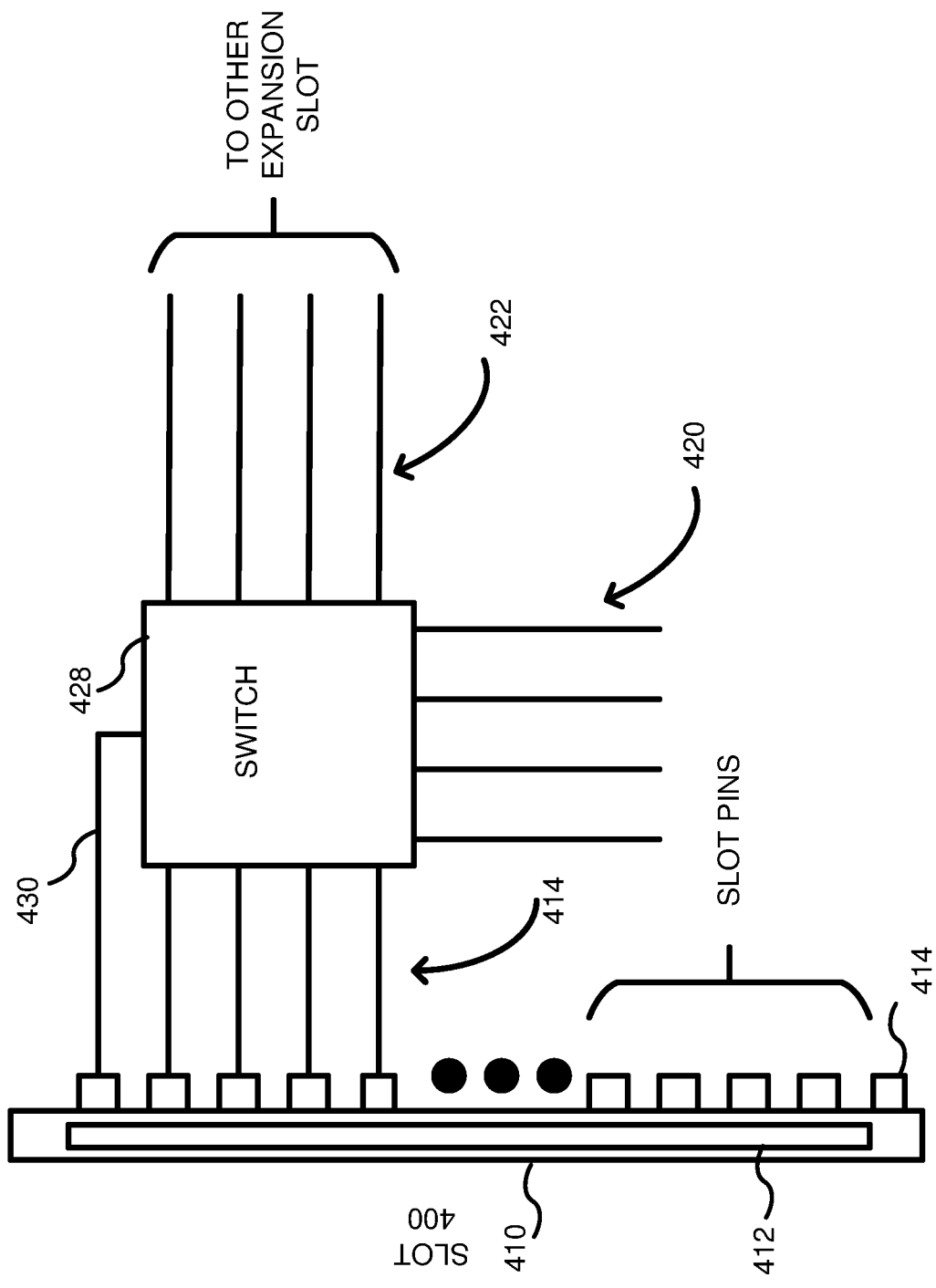
FIG. 4 is an embodiment showing details of pins on an expansion slot and a communication channel including multiple parallel traces on the motherboard that pass through the switch.

FIG. 4 is an example embodiment showing details of a slot 400 and the communication channels associated therewith. The slot 400 includes an outer body portion 410 with an elongated groove 412 for receiving an extension card (not shown). The slot has conductive connectors (not shown) within the groove that mate with connectors on the extension card. The slot 400, therefore, mechanically and electrically couples the extension card to a motherboard. Slot pins 414 are electrical connectors that are coupled to the connectors within the groove so as to electrically connect the extension card to traces on the motherboard. For example, a communication channel 416 is shown as including four parallel traces (generally traces are copper signal lines and can be located on any layer of a multilayer motherboard), but the communication channel can be any desired number of traces. The communication channel 416 is electrically coupled to one of two channels. In particular, channel 416 is electrically coupled to communication channel 420 or communication channel 422 depending on the state of a switch 428 as dictated by control signal line 430. Because the control signal line 430 is controlled by an extension card residing in the slot 400, the extension card can configure one or more switches and signal traffic on the motherboard. For example, if the extension card grounds the control signal 430, then the communication channel 416 can be electrically coupled to communication channel 420 and electrically decoupled from communication channel 422. On the contrary, if the control signal line is a logic high, the switch 428 can change the electrical configuration of the motherboard so that communication channel 416 is electrically coupled to the communication channel 422 and electrically decoupled from communication channel 420. As indicated the communication channel 422 can be coupled to another expansion slot (not shown) to allow cross communication between extension cards.

Figure 5:
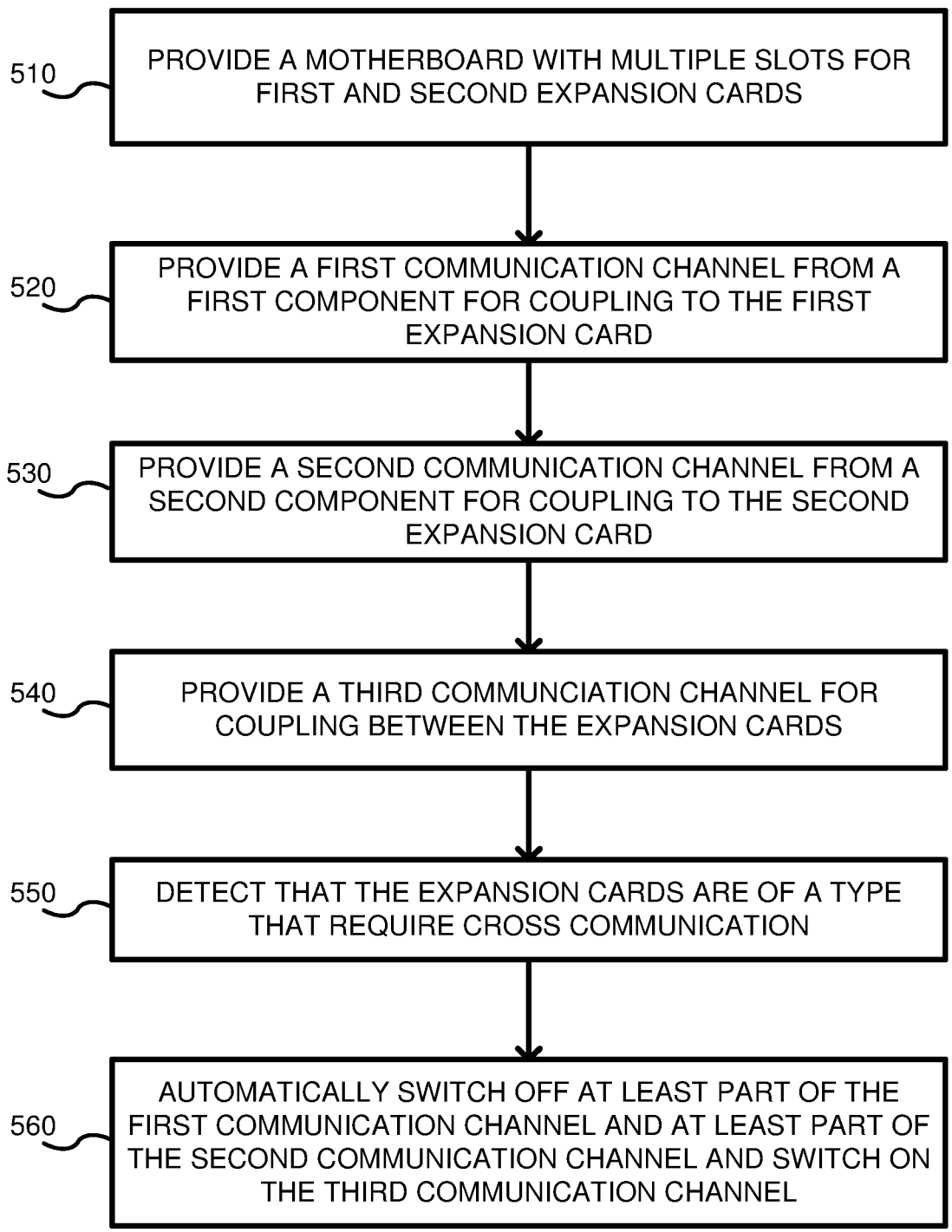
FIG. 5 is an embodiment of a method for configuring a motherboard depending on a type of expansion card placed in the expansion slot.

FIG. 5 is a flowchart of an embodiment for configuring a motherboard using an expansion card. In process block 510, a motherboard is provided with multiple slots for at least first and second expansion cards. Motherboards typically have additional expansion slots, but only two are described for simplicity. In process block 520, a first communication channel is provided that allows for coupling between a first component mounted on the motherboard and the first expansion card. In process block 530, a second communication channel is provided from a second component for coupling to a second expansion card. The first and second components can be processors, for example, but other components can be used. In process block 540, a third communication channel is provided for coupling between the first and second expansion cards. Generally, all of the communication channels are formed using traces on the motherboard. In process block 550, a detection is made that the expansion cards are of a type that permit cross-communication. Generally, detection is accomplished using a control signal input line from the expansion cards. In process block 560, in response to the detection, at least a part of the first communication channel is switched OFF and a least a part of the second communication channel is switched OFF. Finally, the third communication channel is switched ON to allow cross communication between the expansion cards.

Figure 6:
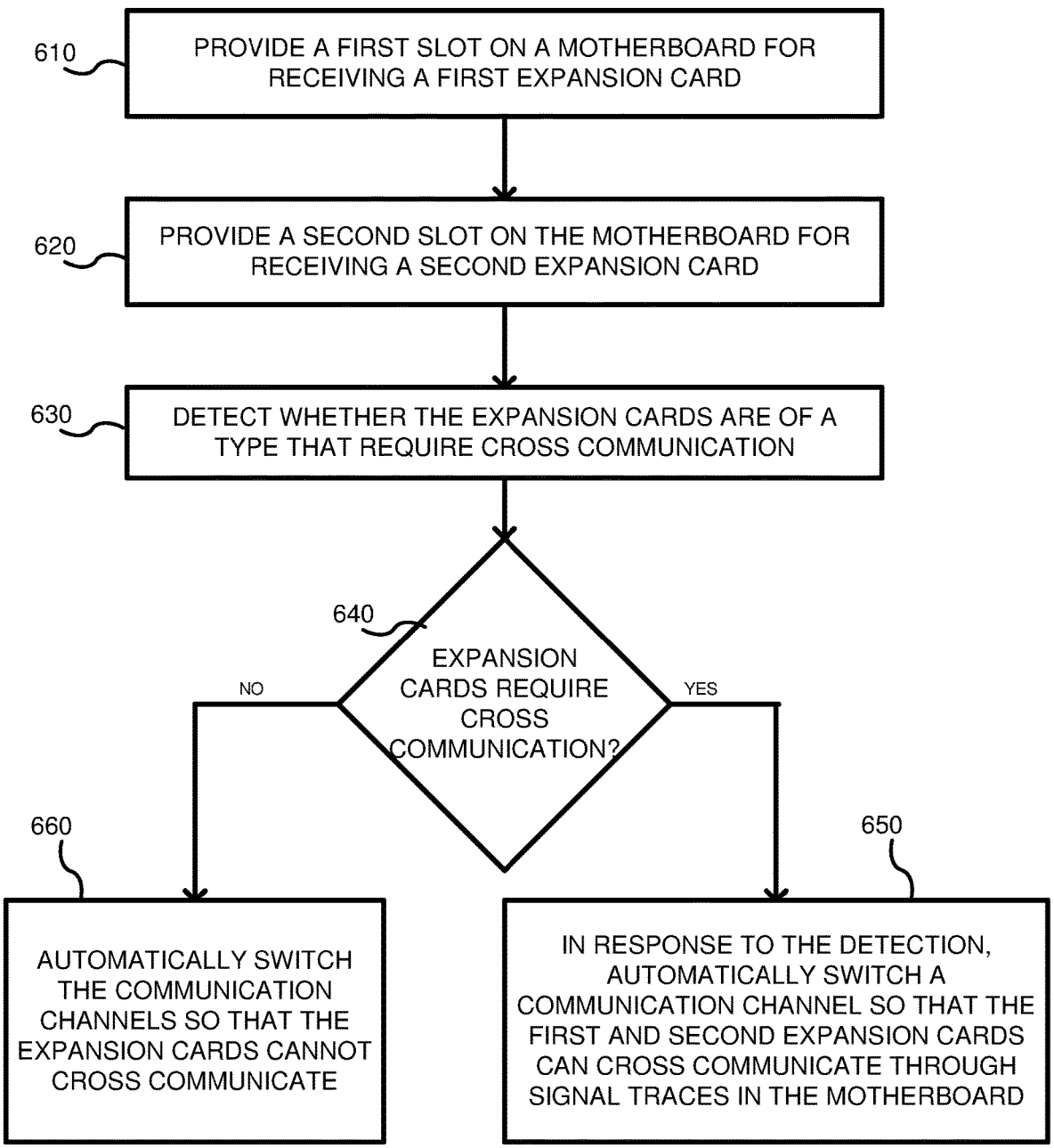
FIG. 6 is another embodiment of a method for configuring a motherboard so that multiple expansion slots can cross communicate.

FIG. 6 is a flowchart of a method according to another embodiment for configuring a motherboard using control information from one or more expansion cards that are plugged into the motherboard. In process block 610, a first slot on a motherboard is provided for receiving a first expansion card. In process block 620, a second slot on the motherboard is provided for receiving a second expansion card. In process block 630, a detection is made whether the expansion cards are a type that permit cross communication there between. The detection can be made by a control signal from each expansion card, such as a control signal extending to a switch. Alternatively, the detection can be made through a query to the expansion card requesting the card type. Such a query can be made by an intelligent switch that is capable of communicating with the expansion card, such as through hardware logic or software. In decision block 640, a determination is made whether the expansion cards are of the type that permit cross communication based on the detection. If the expansion cards do permit cross communication, then in process block 650, a communication channel is automatically switched so that the first and second expansion cards can cross communicate through signal traces on the motherboard. Alternatively, if decision block 640 is decided in the negative, then in decision block 660, the communication channels are automatically switched so that the expansion cards cannot cross communicate. It should be noted that at any point, the expansion cards can dynamically change a control signal so as to reconfigure the motherboard and allow cross communication between the expansion cards. More specifically, if an expansion card sets the control line to switch the above-described switch then the motherboard can be dynamically reconfigured during operation.

Figure 7:
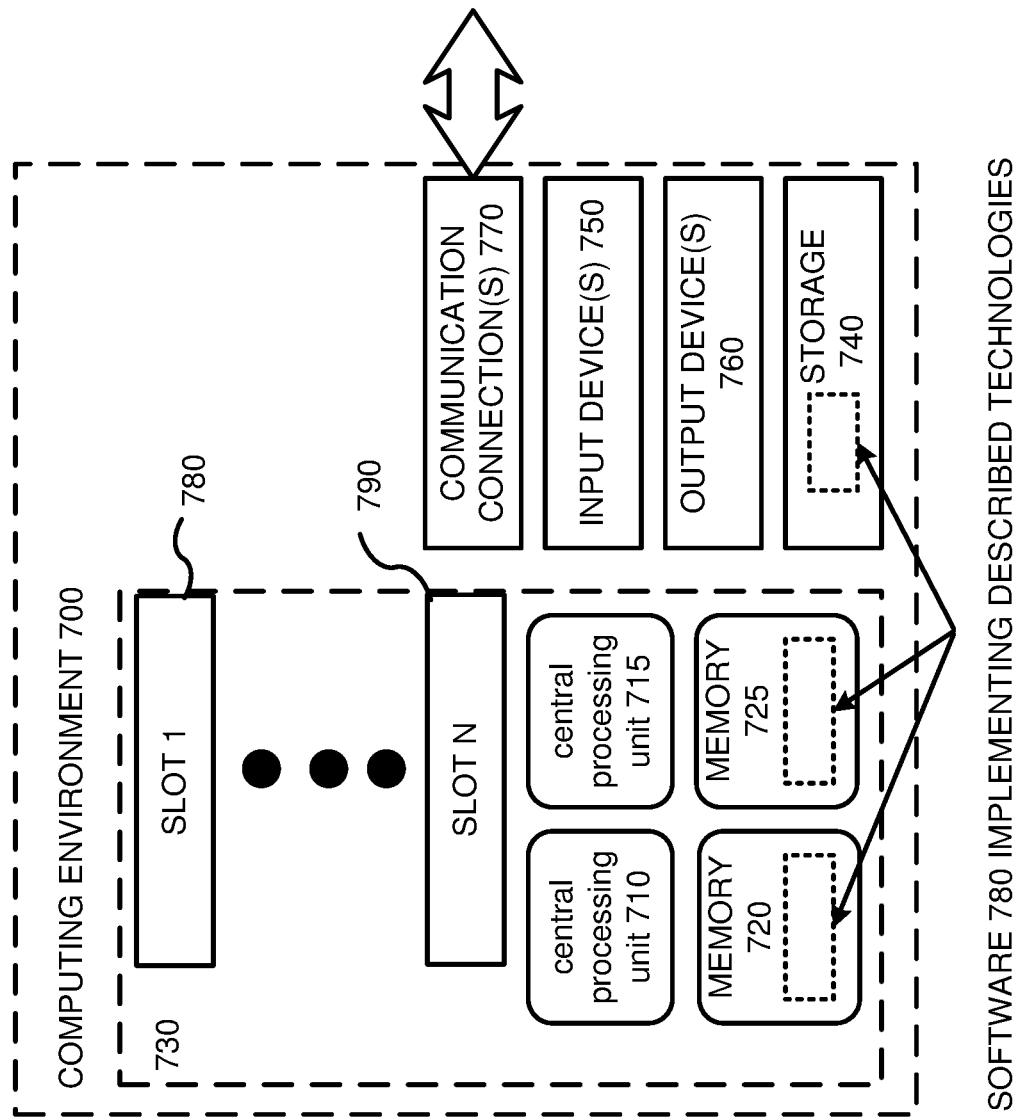
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.) into which a motherboard can be inserted.

With reference to FIG. 7, the computing environment 700 includes one or more processing units 710, 715 and memory 720, 725. In FIG. 7, this basic configuration can be positioned on a motherboard 730, which is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a second central processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The motherboard 730 can further include any number of slots (1-N, where N is any integer number), shown as slot 1 (780) through slot N (790). The slots are designed to plug-in expansion cards into the motherboard 730 in accordance with the embodiments described herein.

Figure 8:
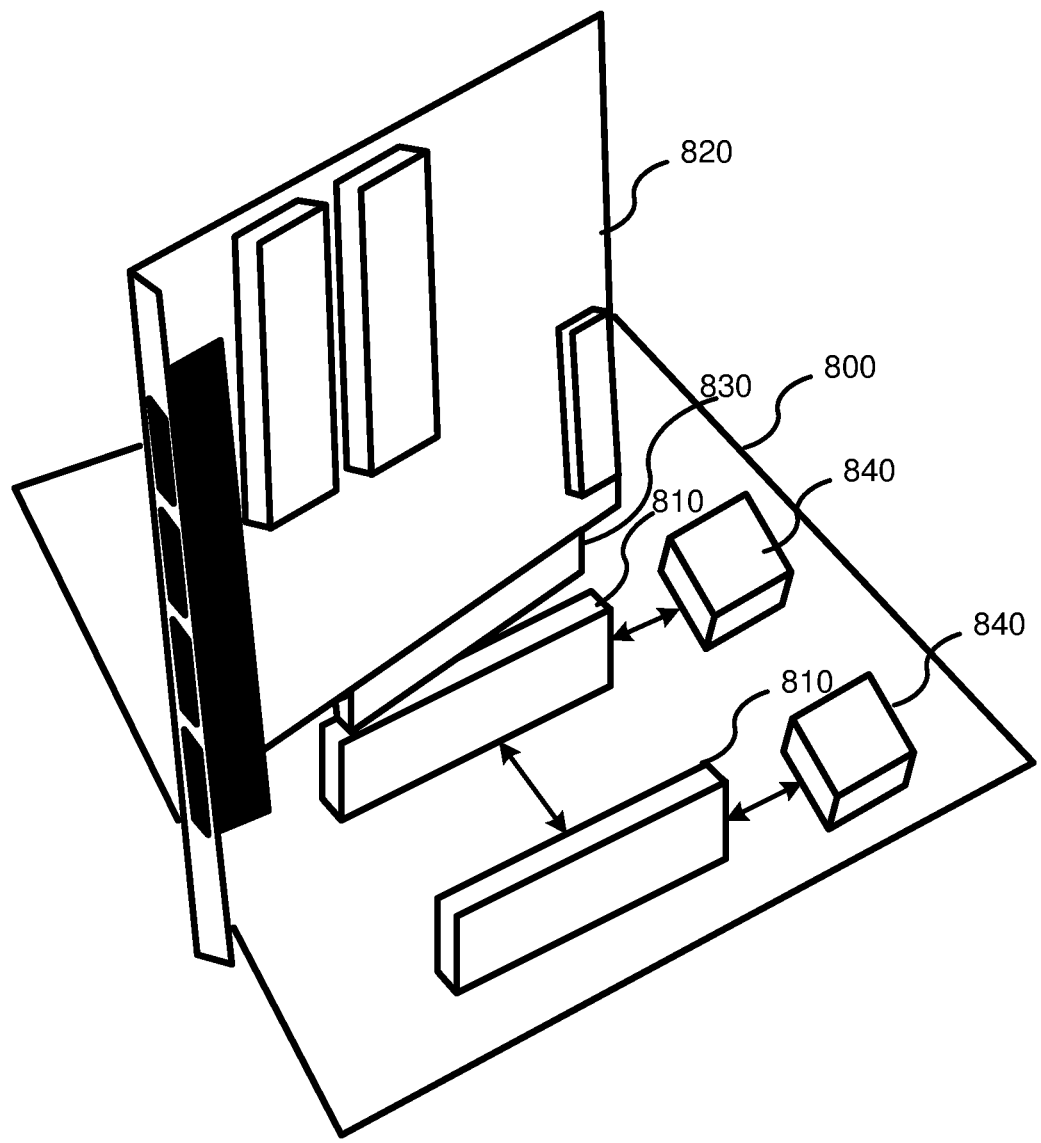
FIG. 8 is an example motherboard having an expansion board plugged into a slot.

FIG. 8 shows an example motherboard 800 with multiple slots 810 for receiving expansion cards. A particular expansion card 820 is shown with a connector 830 that is sized to fit within the slots 810 with a compression fit. Components 840 on the motherboard 800 can be coupled to the slots 810 or the slots 810 can be coupled together to allow cross communication between expansion cards. Switches (not shown) control the communication channels between the slots and the components.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A system comprising:
   a motherboard;
   a first processor positioned on the motherboard;
   first and second slots positioned on the motherboard adapted to receive first and second expansion cards, respectively; and
   a first switch coupled between the first processor and the first slot, the first switch adapted to selectively couple the first slot to the second slot or to selectively couple the first slot to the first processor, wherein the first switch includes a control line coupled to the first slot so that the first expansion card can control a state of the first switch.

2. The system of claim 1, further comprising:
   a second processor positioned on the motherboard;
   a second switch coupled between the second processor and the second slot;
   a first communication channel coupled to the first processor and to the first slot;
   a second communication channel coupled to the second processor and to the second slot; and
   a third communication channel coupled between the first and second slots;
   wherein the first and second switches are adapted to cooperatively couple either the third communication channel to the first and second slots or to couple the first communication channel to the first slot and the second communication channel to the second slot.

3. The system of claim 1, wherein the first switch is a single-pole, double-throw-type switch.

4. The system of claim 1, wherein a predetermined voltage level generated by the first expansion card switches the first switch to couple the first slot to the second slot.

5. The system of claim 1, wherein the motherboard has two modes of operation including a first mode of operation, wherein first and second expansion cards are coupled together via the first and second slots to allow direct cross-communication, and a second mode of operation wherein the first and second expansion cards are coupled to the first and second processors and the first and second expansion cards are not coupled together.

6. The system of claim 1, wherein a communication channel between the first processor and the first slot includes a first portion that permanently connects the first processor to the first slot and a second portion that selectively couples the first processor to the first slot based upon the first switch.

* * * * *